US008725649B2

(12) United States Patent
Gan (10) Patent No.: US 8,725,649 B2
(45) Date of Patent: May 13, 2014

(54) SYSTEM AND METHOD TO PROTECT COMPUTER SOFTWARE FROM UNAUTHORIZED USE (75) Inventor: Zhen-Qi Gan, Carrollton, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/314,964

(22) Filed: Dec. 8, 2011

(65) Prior Publication Data

US 2013/0151861 A1 Jun. 13, 2013

(51) Int. Cl.
*G06F 21/00* (2013.01)

(52) U.S. Cl.
USPC .............. 705/59; 726/21; 726/30; 713/189; 717/174

(58) Field of Classification Search
USPC ........................................ 713/189
See application file for complete search history.

(56) References Cited

U.S. PATENT DOCUMENTS

| 5,708,709 | A  | * | 1/1998  | Rose .................... 705/59 |
| 6,889,212 | B1 | * | 5/2005  | Wang et al. ............ 705/59 |
| 7,111,285 | B2 | * | 9/2006  | Smith et al. ............ 717/140 |
| 2003/0177074 | A1 | * | 9/2003 | Ramanathan ........... 705/26 |
| 2004/0167859 | A1 | * | 8/2004 | Mirabella ............... 705/59 |
| 2005/0091496 | A1 | * | 4/2005 | Hyser .................... 713/175 |
| 2008/0113789 | A1 | * | 5/2008 | Canessa et al. .......... 463/29 |
| 2010/0325734 | A1 | * | 12/2010 | Etchegoyen ............ 726/26 |

* cited by examiner

*Primary Examiner* — Hadi Armouche
*Assistant Examiner* — Bryan Wright
(74) *Attorney, Agent, or Firm* — Schwegman, Lundberg & Woessner, P.A.

(57) ABSTRACT

A system and method encrypt a license file associated with computer software using a private key. The license file includes one or more license keys, and each license key is associated with a feature of the computer software. The license file associated with the computer software is decrypted at runtime using a public key. A module determines whether a user is permitted to execute the computer software. The module is authenticated by one or more of a determination of whether a hash code included within the module matches a hash code generated by a user of the computer software at run time of the computer software, and an encryption of the module prior to run time of the computer software using the private key and a decryption of the module at run time of the computer software using the public key.

17 Claims, 3 Drawing Sheets

LICENSE KEY ⟶ 115

| PRODUCT OR FEATURE NAME | PRODUCT OR FEATURE VERSION | LICENSEE NAME | LICENSEE HOST NAME | EXPIRATION DATE | X.509 SERIAL NUMBER | NUMBER OF UNITS |

FIG. 3

SYSTEM AND METHOD TO PROTECT COMPUTER SOFTWARE FROM UNAUTHORIZED USE

TECHNICAL FIELD

The present disclosure relates to a system and method to protect computer software from unauthorized use.

BACKGROUND

Legitimate use of software applications are typically enforced by encoded digital licenses with secret product keys. Vendors typically devise proprietary encoding algorithms and compile them in machine specific binaries to prevent the unauthorized use of computer software or applications. With the advent of computer programming languages such as Java, such verification unfortunately can easily be identified and hijacked to by-pass the license check and enable the unauthorized use of the software.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
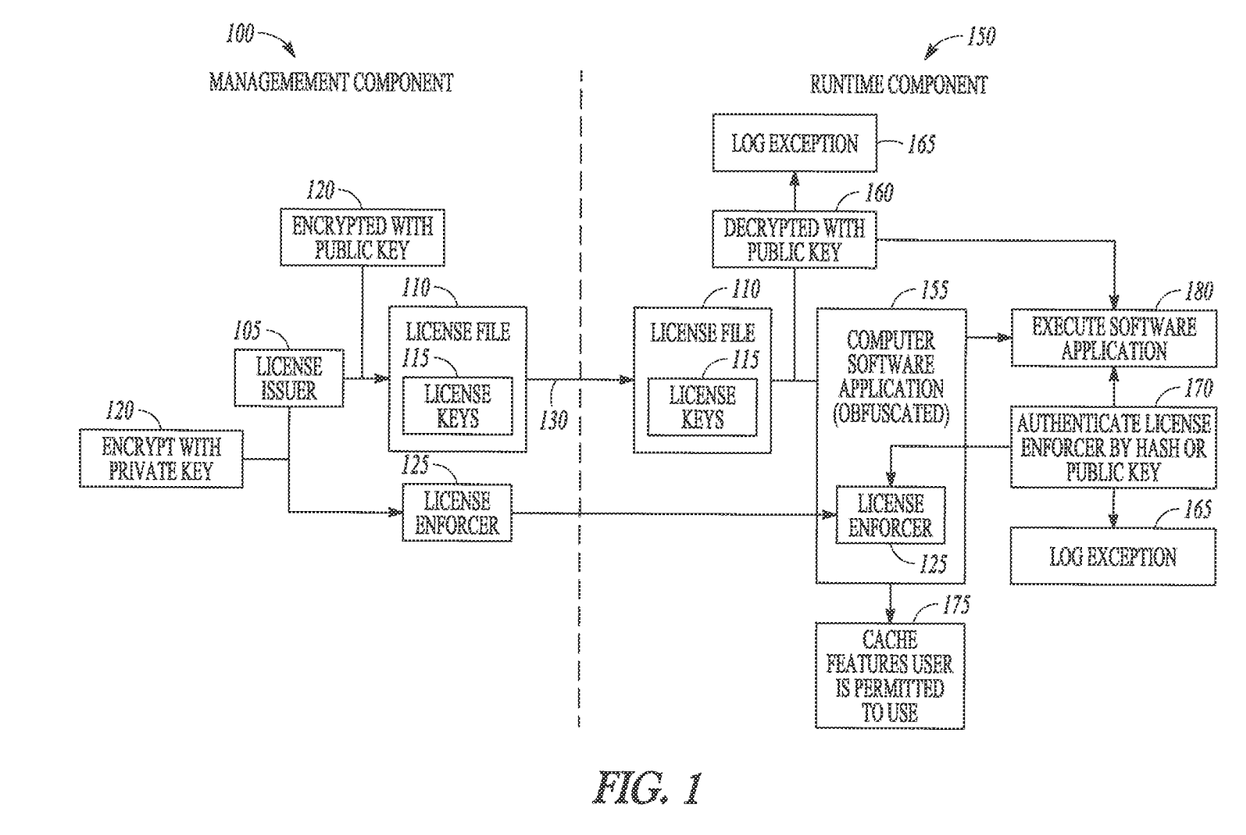
FIG. 1 is a block diagram illustrating a system to protect against unauthorized use of software.

An embodiment relates to a system and method to prevent the hijacking or unauthorized use of computer software by adopting a license protection mechanism using the standard Public Key Infrastructure (PKI). As illustrated in FIG. 1, there are two components—a management component 100 and a runtime component 150. The management component is used by an issuer of the license, and it generates license keys that contain licensee information. The runtime component can be packaged together with the computer software application, and it verifies the validity of the license during runtime.

The management component 100 encrypts a license file 110 using a private key at 120, normally the private key of the license issuer 105. The license file 110 is for use in protecting computer software 155 from unauthorized use, or put another way, it authorizes the use of the computer software 155 by a particular user. The license file 110 can include a single license key 115 that authorizes the use of a single version of the computer software 155 or even a single feature of the computer software 155. The license file 110 can also include several license keys 115, wherein each license key 115 authorizes the use of a particular version of computer software 155 or even particular features of the computer software 155. The management component 100 should not be delivered and packaged along with the computer software 155, so as to protect the secret license generation algorithm.

Figure 2:
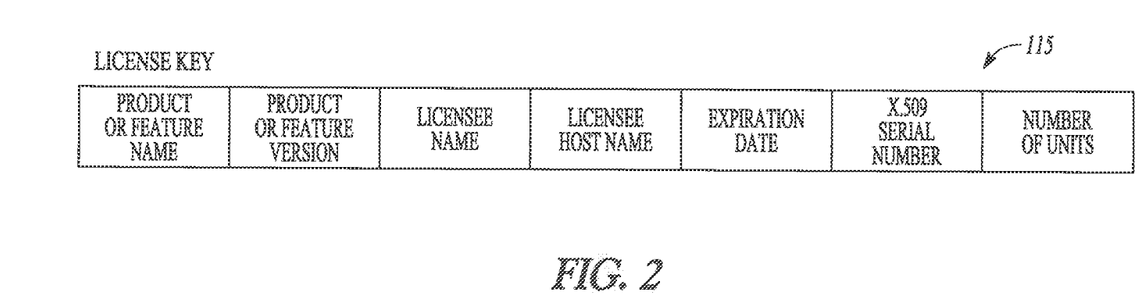
FIG. 2 is a block diagram of a license key that is used to protect against the unauthorized use of software.

As noted, a license file 110 can include a list of one or more licenses or license keys 115 wherein each license contains one or more of the following—a product name or a feature name, a product version or a feature version, a licensee or user's name, a licensee host name (e.g., a MAC address) for a node-locked license, an expiration date, a serial number of an x.509 certificate that is used to generate a license key, and a number of units that are permitted to execute the computer software. A diagrammatic example of a license key 115 is illustrated in FIG. 2. As illustrated in FIG. 2, a license key 115 is generated from the concatenation of the product/feature (name, version) and licensee information (name, host name), and this concatenation is encrypted at 120 by the private key of the license issuer 105. So as can be seen, licensee specific information is used as a part of the information for license key generation. This enables a direct and implanted connection between the license and the physical machine/end user.

In the license file, a feature or feature name can be a specific feature, or it can be the entire software application 155. For the product version or feature version, the license key 115 can include a construct to indicate whether the user is authorized to use a major version, a minor version, or an incremental version. The license key 115 can also indicate a qualifier, which notes minor product fixes. If this information is omitted, the system can assume that the user is authorized to use all versions. Similarly, regarding the host name, a user can be authorized to use all nodes (such as by putting a wildcard "*" in the proper portion of the license key). If the expiration date is omitted, the user is considered to have a perpetual license. After concatenation, the license key 115 can be encoded in base 64 (using the license key of the license issuer) for embedding in the license file 110. This process guarantees the key uniqueness of each license and ensures that only the license issuer 105 can verify the validity of a license file 110 with its public key at 160. The public key is packaged together with the runtime component as a part of the license issuer's PKI certificate such as the x.509 certificate. Additionally, the license issuer 105 can use its private key at 120 to encrypt a module that will be used by the user to check the license file at runtime. This module can be referred to as the license enforcer module 125.

After the license file 110 has been created by the license issuer 105, the license file 110 is provided at 130 to a user's machine. The license file 110 is normally generated by the license issuer 105 after the computer software has been delivered to the user. The computer software 155 decrypts the license file at 160 using the public key of the license issuer 105. The license enforcer module 125 on the user's machine can be embedded in the computer software 155. The license enforcer module 125 examines the license file to determine if a user is authorized to use the computer software 155, and/or to determine what particular features of the computer software 155 that the user is authorized to use. In conjunction with this determination, the user of the computer software 155 is prompted for one or more of the product name, the product version, feature name, licensee name, host ID, expiration data, and unit. Additionally, as another security check, to prevent hackers from swapping the license enforcer module software class with a fake one that always permits the computer software 155 to execute, the computer software 155 authenticates the license enforcer module at 170. Specifically, the computer software determines whether a cryptographic hash code included within the license enforcer module matches a hash code generated by a user of the computer software at run time of the computer software. The hash can be based on either MD5 or SHA (Secure Hash Algorithm) algorithms. The cryptographic hash can also ensure the authenticity of interfaces enforced by the license enforcer 125. At 170, the computer software 155 also decrypts the license enforcer module at run time of the computer software using the public key of the license issuer 105. In an embodiment, the public key is packaged as a part of a runtime library, and is used to decrypt the license for further license verification and enforcement.

In an embodiment, Java annotation is used to implement the license key 115 required to execute a feature of the computer software 155. Specifically, Java annotation is utilized by application developers to specify minimum license requirements for enabling a feature in the application software 155. This non intrusive way of defining license requirements enables application developers to scatter the license verification logic across the software 155 with simple annotations. It further deters hackers from identifying and then disabling the license enforcement points. To even further deter hackers from tampering with the license enforcer logic, an embodiment obfuscates the computer software application 155 to conceal the license enforcer check logic. Java annotation can be used to implement this obfuscation. Specifically, in an embodiment, Java application code is obfuscated to conceal the license checking logic in the application software.

As noted, the license enforcer 125 uses at 160 the public key from the standard PKI of either RSA, DSA to decrypt the license key 115 embedded in the license file 110. The license enforcer 125, which as noted above is a part the runtime component 150, intercepts Java application calls and verifies only methods with the distinct license enforcer annotation against the permissions granted in the license. An example of such an annotation scheme is illustrated below in the appendix. As noted above, the system ensures the authenticity of the license enforcer 125 by verifying the hash and/or the digital signature, and uses hash and/or digital signature to verify the validity of the license. The license enforcer 125 then checks the properties of the license against the requirements specified by the annotation during runtime. License exceptions occur when the license requirement is not satisfied. Upon catching such a license exception, the application can be designed so that the application ceases operation, and such exceptions can be logged at 165.

When the license enforcer module 125 examines the license file 110 to determine if a user is authorized to use the computer software 155 or a particular feature of the computer software, the license enforcer module reads the data from the license file 110. As noted above, this data is put into the license file by the license issuer 105, and can include one or more of the product name, the feature name, the product version, the feature version, the licensee name, the licensee host name, the expiration date, the serial number of the x.509 certificate that includes the public key, and the number of units permitted to execute the feature. The license enforcer 125 then examines the data in the computer software 155 that is associated with the user and compares it with the data in the license file 110. If the data in the computer software 155 matches the data read from the license file 110, the user is permitted to execute the computer software 155 and/or a particular feature of the computer software 155. If the data in the license key 115 does not match the data resident within the computer software 155, the license enforcer 125 terminates the execution of the computer software 155. As previously noted, the license enforcer 125 can enforce the requirements as specified by Java annotation in the computer software, according to the attributes that are in the license file 110. The feature of the computer software 155 is not invoked if the license attribute in the license file 110 fails to match the Java annotation. Any violation can be logged to a database at 165. If a user is authorized to execute the computer software 155, the computer software executes a 180.

As just noted, the license enforcer module 125 that is embedded in the computer software 155 terminates the execution of the software if the data in the license file 110 does not match the data (annotation) within the computer software 155. The execution of the computer software 155 can also be terminated if there is a failure to properly decrypt the license file at 160 at runtime using the public key of the license issuer 105, a failure at 170 to match the hash code in the license enforcer module 125 with the hash code generated by the user of the software at runtime of the computer software, or a failure at 170 to decrypt the license enforcer module using the public key at runtime of the computer software.

In an embodiment, at 175, the system caches a feature of the computer software 155 for which the license enforcer 125 has determined that the user is permitted to use. Thereafter, when a user invokes the computer software 155 or the feature that has been cached, the system can simply check the cache, instead of the more processor intensive and time consuming steps of reading the license file 110 and checking to see if the license keys 115 authorized use of the computer software 155. That is, once verified, the methods are cached in memory so that they are not verified again on subsequent calls so as to minimize performance impact.

Figure 3:
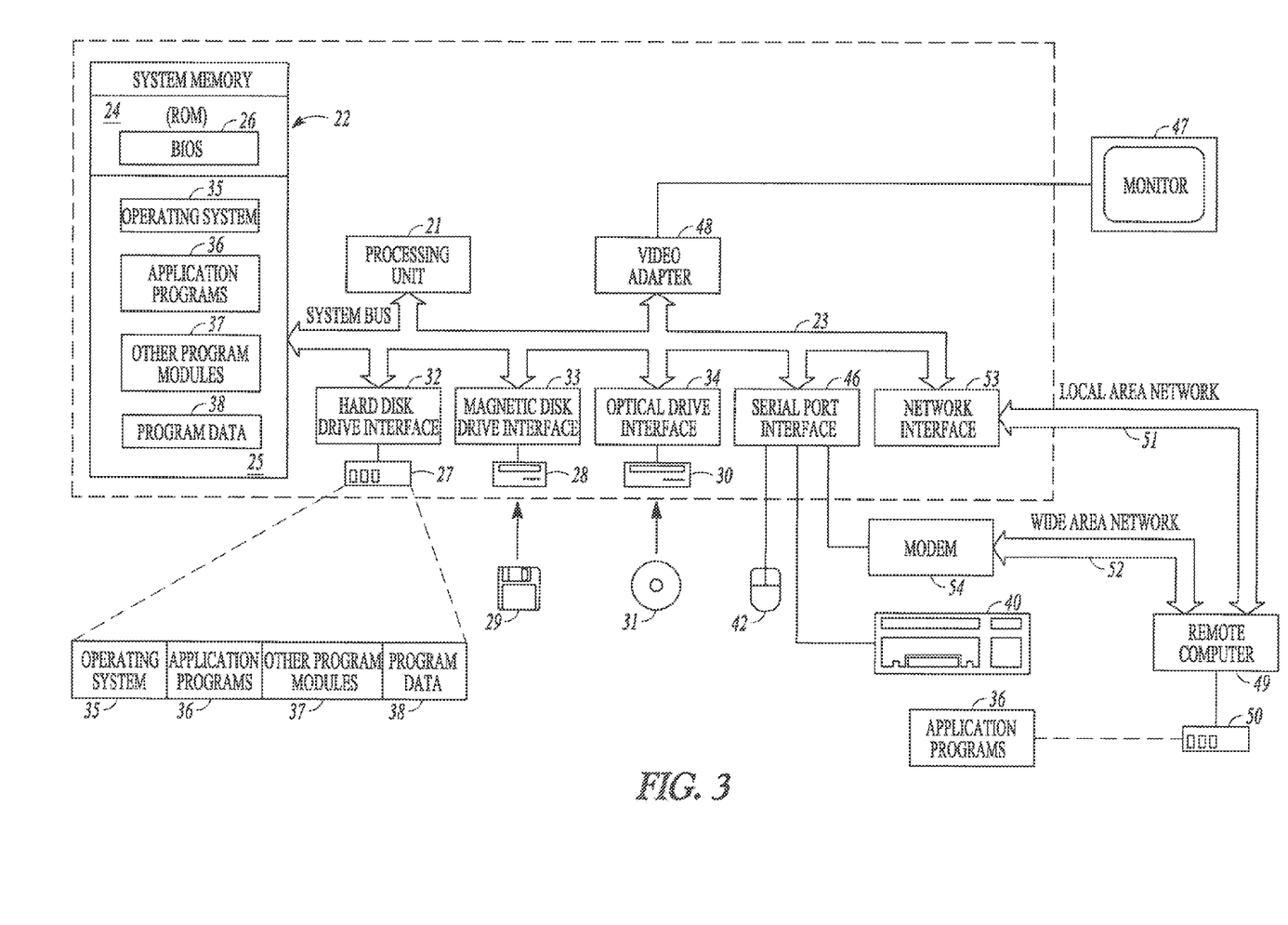
FIG. 3 is a block diagram of a computer processing system upon which one or more embodiments of the present disclosure can execute.

FIG. 3 is an overview diagram of a hardware and operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

Example Embodiments

Several embodiments and sub-embodiments have been disclosed above, and it is envisioned that any embodiment can be combined with any other embodiment or sub-embodiment. Specific examples of such combinations are illustrated in the examples below.

Example No. 1 is a system including a computer processor configured to protect computer software from unauthorized use by encrypting a license file associated with the computer software using a private key. The license file includes one or more license keys, each license key associated with a feature of the computer software. The computer processor is further configured for decrypting the license file associated with the computer software at runtime of the computer software using a public key. The computer processor is also configured with a module to determine whether a user is permitted to execute the computer software. The computer processor is further configured to authenticate the module by one or more of determining whether a hash code included within the module matches a hash code generated by a user of the computer software at run time of the computer software, and encrypting the module prior to run time of the computer software using the private key and decrypting the module at run time of the computer software using the public key.

Example No. 2 includes the features of Example No. 1 and optionally includes a system wherein the private key and the public key are associated with a licensor of the computer software.

Example No. 3 includes the features of Example Nos. 1-2 and optionally includes a system wherein the computer software is obfuscated.

Example No. 4 includes the features of Example Nos. 1-3 and optionally includes a system wherein the license key required to execute a feature of the computer software is implemented in a JAVA annotation scheme.

Example No. 5 includes the features of Example Nos. 1-4 and optionally includes a system wherein the license key comprises one or more of a product name, a feature name, a product version, a feature version, a licensee name, a licensee host name, an expiration date, a serial number of an x.509 certificate used to generate the public key, and a number of units permitted to execute the feature.

Example No. 6 includes the features of Example Nos. 1-5 and optionally includes a system wherein the module determines whether a user is permitted to execute the computer software by reading data from the license file including one or more of the product name, the feature name, the product version, the feature version, the licensee name, the licensee host name, the expiration date, the serial number of the x.509 certificate that includes the public key, and the number of units permitted to execute the feature, and comparing the data from the license file with data associated with a user of the software including one or more of the product name, the feature name, the product version, the feature version, the licensee name, the licensee host name, the expiration date, the serial number of the x.509 certificate that includes the public key, and the number of units permitted to execute the feature; and wherein the module is configured to terminate execution of the computer software when one or more of the comparisons do not match.

Example No. 7 includes the features of Example Nos. 1-6 and optionally includes a system wherein the computer software comprises one or more major versions, one or more minor versions, one or more incremental versions, and one or more qualifiers.

Example No. 8 includes the features of Example Nos. 1-7 and optionally includes a system wherein a particular license key comprises a subset of the one or more major versions, the one or more minor versions, the one or more incremental versions, and the one or more qualifiers.

Example No. 9 includes the features of Example Nos. 1-8 and optionally includes a system wherein the computer processor is configured to terminate execution of the computer software upon one or more of a failure to properly decrypt the license file for the computer software at runtime of the computer software using the public key, a failure to match the hash code in the module with the hash code generated by the user of the software at runtime of the computer software, and a failure to decrypt the module using the public key at runtime of the computer software.

Example No. 10 includes the features of Example Nos. 1-9 and optionally includes a system wherein the license file is generated by the licensor after the computer software is delivered to a user of the computer software.

Example No. 11 includes the features of Example Nos. 1-10 and optionally includes a system wherein the module is embedded in the computer software.

Example No. 12 includes the features of Example Nos. 1-11 and optionally includes a system including a computer processor configured to cache a feature of the computer software for which the computer processor has determined that the user is permitted to use.

Example No. 13 is a process comprising encrypting a license file associated with computer software using a private key. The license file includes one or more license keys, each license key associated with a feature of the computer software. The process includes decrypting the license file associated with the computer software at runtime of the computer software using a public key, determining using an enforcer module whether a user is permitted to execute the computer software, and authenticating the enforcer module by one or more of determining whether a hash code included within the enforcer module matches a hash code generated by a user of the computer software at run time of the computer software, and encrypting the enforcer module prior to run time of the computer software using the private key and decrypting the enforcer module at run time of the computer software using the public key.

Example No. 14 includes the features of Example No. 13 and optionally includes obfuscating the computer software.

Example No. 15 includes the features of Example Nos. 13-14 and optionally includes a process wherein the license key comprises one or more of a product name, a feature name, a product version, a feature version, a licensee name, a licensee host name, an expiration date, a serial number of an x.509 certificate used to generate the public key, and a number of units permitted to execute the feature.

Example No. 16 includes the features of Example Nos. 13-15 and optionally includes determining with the enforcer module whether a user is permitted to execute the computer software by reading data from the license file including one or more of the product name, the feature name, the product version, the feature version, the licensee name, the licensee host name, the expiration date, the serial number of the x.509 certificate that includes the public key, and the number of units permitted to execute the feature, and comparing the data from the license file with data associated with a user of the software including one or more of the product name, the feature name, the product version, the feature version, the licensee name, the licensee host name, the expiration date, the serial number of the x.509 certificate that includes the public key, and the number of units permitted to execute the feature; and wherein the enforcer module is configured to terminate execution of the computer software when one or more of the comparisons do not match.

Example No. 17 includes the features of Example Nos. 13-16 and optionally includes terminating execution of the computer software upon one or more of a failure to properly decrypt the license file for the computer software at runtime of the computer software using the public key, a failure to match the hash code in the enforcer module with the hash code generated by the user of the software at runtime of the computer software, and a failure to decrypt the enforcer module using the public key at runtime of the computer software.

Example No. 18 includes the features of Example Nos. 13-17 and optionally includes caching a feature of the computer software for which it has been determined that the user is permitted to use.

Example No. 19 is a computer readable storage device including instructions that when executed by a processor execute a process comprising encrypting a license file associated with computer software using a private key. The license file comprises one or more license keys, each license key associated with a feature of the computer software. The computer readable storage device further includes instructions for decrypting the license file associated with the computer software at runtime of the computer software using a public key, determining using an enforcer module whether a user is permitted to execute the computer software, and authenticating the enforcer module by one or more of determining whether a hash code included within the enforcer module matches a hash code generated by a user of the computer software at run time of the computer software, and encrypting the enforcer module prior to run time of the computer software using the private key and decrypting the enforcer module at run time of the computer software using the public key.

Example No. 20 includes the features of Example No. 19 and optionally includes a computer readable storage device wherein the license key comprises one or more of a product name, a feature name, a product version, a feature version, a licensee name, a licensee host name, an expiration date, a serial number of an x.509 certificate used to generate the public key, and a number of units permitted to execute the feature. The computer readable storage device further includes instructions for determining with the enforcer module whether a user is permitted to execute the computer software by reading data from the license file including one or more of the product name, the feature name, the product version, the feature version, the licensee name, the licensee host name, the expiration date, the serial number of the x.509 certificate that includes the public key, and the number of units permitted to execute the feature, and comparing the data from the license file with data associated with a user of the software including one or more of the product name, the feature name, the product version, the feature version, the licensee name, the licensee host name, the expiration date, the serial number of the x.509 certificate that includes the public key, and the number of units permitted to execute the feature; and wherein the enforcer module is configured to terminate execution of the computer software when one or more of the comparisons do not match and terminating execution of the computer software upon one or more of a failure to properly decrypt the license file for the computer software at runtime of the computer software using the public key, a failure to match the hash code in the enforcer module with the hash code generated by the user of the software at runtime of the computer software, and a failure to decrypt the enforcer module using the public key at runtime of the computer software.

Appendix

The following example shows how methods in a class ProfitCenter are enforced by various license attributes.

```
import com.rtn.license.EnforceLicense;
import com.rtn.license.MatchPolicy;
// required interface with annotations that specifies required license
interface LicensedFeatures
{
    //ensures the MoneyMaker product has a valid license
    @EnforceLicense( name="MoneyMaker" )
    public boolean enableMoneyFeature( );
    // ensures MoneyMaker has a valid license with version greater than or equal to 1.
    // The default match policy matches the major version
    @EnforceLicense( name="MoneyMaker", version="1")
    public boolean enableVersion1MoneyFeature( );
    // ensures MoneyMaker has a valid license with version 1 or greater and has at least 10 units
    @EnforceLicense( name="MoneyMaker", version="1" requiredUnits=10 )
    public boolean enableVersion1MoneyFeatureWithAtLeast10Units( );
    // ensures MoneyMaker has a valid version 2 or greater license.
    @EnforceLicense( name="MoneyMaker", version="2",
matchPolicy=MatchPolicy.MAJOR_VERSION_MATCH)
    public boolean enableVersion2MoneyFeature( );
    // ensures MoneyMaker has a valid version 1.1 license.
    @EnforceLicense( name="MoneyMaker", version="1.1",
matchPolicy=MatchPolicy.MINOR_VERSION_MATCH)
    public boolean enableVersion11MoneyFeature( );
    // ensures MoneyMaker has a valid version 1.1.2 license.
    @EnforceLicense( name="MoneyMaker", version="1.1.2",
matchPolicy=MatchPolicy.INCREMENTAL_VERSION_MATCH)
    public boolean enableVersion111MoneyFeature( );
}
public class ProfitCenter implements LicensedFeatures
{
    @Override
    public boolean enableMoneyFeature( )
    {
        ...
    }
    @Override
    public boolean enableVersion1MoneyFeature( )
    {
        ...
    }
    @Override
    public boolean enable Version1MoneyFeatureWithAtLeast10Units( )
    {
        ...
    }
    @Override
    public boolean enableVersion2MoneyFeature( )
```

```
            {
                ...
            }
            @Override
            public boolean enableVersion11MoneyFeature( )
            {
                ...
            }
            @Override
            public boolean enableVersion111MoneyFeature( )
            {
                ...
            }
            public static void main( String args[ ] )
    {
            try
            {
                //Create an enforcer for the ProfitCenter application with the given license file
                //The license file should be 1) on the system class loading path, 2) class loading path
with this
                //class's context, or 3) an absolute file system path
                LicenseEnforcer<ProfitCenter> le = new LicenseEnforcer( "license.xml" );
                //Authenticate the enforcer by matching the secret hash. Some malicious hackers may
                //replace the class with their version to bypass the license checks
                final BigInteger KeptSecret = new BigInteger(
"39320239078518293748912738473847384783");
                //Make sure the Interface is not swapped
                final BigInteger InterfaceHash = new BigInteger(
"348538562346260o7587565923586223786");
                //the secret changes between versions, so it is important for applications to
                //obtain the "secret"" using the management tool of the same version.
                BigInteger secret = le.getSecret( );
                BigInteger appHash = le.getSecret( LicensedFeatures.class );
                //Run the application only when the interface and the enforcer are authentic
                if (KeptSecret.equal( secret ) && InterfaceHash.equal( appHash ))
                {
                    ProfitCenter pc = new ProfitCenter( );
                    LicensedFeatures lf = le.enforce( pc );
                    lf.enableMoneyFeature( )
                    lf.enableVersion1MoneyFeature( )
                    lf.enableVersion1MoneyFeatureWithAtLeast10Units( )
                    lf.enableVersion2MoneyFeature( )
                    lf.enableVersion11MoneyFeature( )
                    lf.enableVersion111MoneyFeature( )
                }
            }
            catch (LicenseException e)
            {
                // bad license
                ...
            }
            catch (IOException e)
            {
                // failed to load the license
                ...
            }
        }
    }
```

In another embodiment, applications also can directly verify the license file with a private method preferably within an inner class as illustrated below:

```
    private void loadProductLicense( String licensePath ) throws IOException
    {
        try
        {
            // from lictool -hash
            final BigInteger myHash = new BigInteger(
"59823575233157295294431396288469793681");
            class MyFactory extends CheckerFactory
            {
                private MyFactory( )
                {
                    super( );
```

```
            }
            private void loadLicense( String licensePath )
                throws IOException, LicenseException
            {
                InputStream is = null;
                is = getClass( ).getResourceAsStream( licensePath );
                if (is == null)
                  {
                      is = ClassLoader.getSystemResourceAsStream( licensePath );
                  }
                if (isAuthentic( this.getCheckerHash( )))
                  {
                      Checker checker = getChecker( );
                      checker.loadLicense( is );
                      _license = checker.getValidLicense( "SampleApp" );
                  }
            }
            private boolean isAuthentic( BigInteger hash )
            {
                return myHash.equals( hash );
            }
        };
        MyFactory myFactory = new MyFactory( );
        myFactory.loadLicense( licensePath );
    }
    catch (LicenseException e )
    {
        // exit due to invalid license
        System.err.println( e.getMessage );
        System.exit( 0 );
    }
    catch (NoSuchAlgorithmException e)
    {
        System.exit( 0 );
    }
}
```

As noted above, the code can be obfuscated in order to protect license checking from being hacked. If the application uses Maven, the proguard plugin can be used to obfuscate the code as illustrated in the following example:

```
<plugin>
  <groupId>com.pyx4me</groupId>
  <artifactId>proguard-maven-plugin</artifactId>
  <executions>
    <execution>
      <phase>process-classes</phase>
      <goals>
        <goal>proguard</goal>
      </goals>
    </execution>
  </executions>
  <configuration>
    <obfuscate>true</obfuscate>
    <options>
      <option>-keep public class * {public protected *;}</option>
      <option>-keepattributes Exceptions,InnerClasses,Signature,Deprecated,SourceFile,LineNumberTable,*Annotation*,EnclosingMethod</option>
    </options>
    <injar>classes</injar>
    <libs>
      <lib>${java.home}/lib/rt.jar</lib>
      <lib>${java.home}/lib/jsse.jar</lib>
    </libs>
    <skip>false</skip>
  </configuration>
</plugin>
```

An example of a coded license file is as follows:

```
<product xmlns="http://rtn.com/license" version="1.0" name="SampleApp">
    <license>
        <component>SampleApp</component>
        <host>any</host>
        <licensee>First Buyer</licensee>
        <serial>S8xkcA==</serial>
<key>hbToH/l95fDgiOwfWbUYR7iGu2e4q0I6N5lB+3uS0ZTTQaamM/prG0cOnHkPLTnV0g/
5DUwlp4kn9JV8P/l5Qg==</key>
        <units>9</units>
        <type>sdk</type>
    </license>
</product>
```

The invention claimed is:

1. A system comprising:
a computer processor to protect computer software from unauthorized use by:
encrypting a license file associated with the computer software using a private key, wherein the license file comprises one or more license keys, each license key associated with a feature of the computer software; and
decrypting the license file associated with the computer software at runtime of the computer software using a public key;
a second computer processor to determine whether a user is permitted to execute the computer software; and
a third computer processor to authenticate the second computer processor by one or more of:
determining whether a hash code included within the second computer processor matches a hash code generated by a user of the computer software at run time of the computer software; and
encrypting the second computer processor prior to run time of the computer software using the private key and decrypting the second computer processor at run time of the computer software using the public key;
wherein the computer software comprises one or more major versions, one or more minor versions, one or more incremental versions, and one or more qualifiers;
wherein the one or more qualifiers denote minor fixes to the computer software;
wherein the license key comprises one or more of a product name, a feature name, a product version, a feature version, a licensee name, a licensee host name, an expiration date, a serial number of an x.509 certificate used to generate the public key, and a number of units permitted to execute the feature; and
wherein the second computer processor determines whether a user is permitted to execute the computer software by reading data from the license file including one or more of the product name, the feature name, the product version, the feature version, the licensee name, the licensee host name, the expiration date, the serial number of the x.509 certificate that includes the public key, and the number of units permitted to execute the feature, and comparing the data from the license file with data associated with a user of the software including one or more of the product name, the feature name, the product version, the feature version, the licensee name, the licensee host name, the expiration date, the serial number of the x.509 certificate that includes the public key, and the number of units permitted to execute the feature; and wherein the second computer processor terminates execution of the computer software when one or more of the comparisons do not match.

2. The system of claim 1, wherein the private key and the public key are associated with a licensor of the computer software.

3. The system of claim 1, wherein the computer software is obfuscated.

4. The system of claim 1, wherein the license key required to execute a feature of the computer software is implemented in a JAVA annotation scheme.

5. The system of claim 1, wherein a particular license key comprises a subset of the one or more major versions, the one or more minor versions, the one or more incremental versions, and the one or more qualifiers.

6. The system of claim 1, wherein the second computer processor terminates execution of the computer software upon one or more of a failure to properly decrypt the license file for the computer software at runtime of the computer software using the public key, a failure to match the hash code in the second computer processor with the hash code generated by the user of the software at runtime of the computer software, and a failure to decrypt the second computer processor using the public key at runtime of the computer software.

7. The system of claim 1, wherein the license file is generated by the licensor after the computer software is delivered to a user of the computer software.

8. The system of claim 1, wherein the second computer processor includes the computer software.

9. The system of claim 1, comprising a fourth computer processor to cache a feature of the computer software for which the second computer processor has determined that the user is permitted to use.

10. A method comprising:
encrypting a license file associated with computer software using a private key, wherein the license file comprises one or more license keys, each license key associated with a feature of the computer software; and
decrypting the license file associated with the computer software at runtime of the computer software using a public key;
determining using an enforcer processor whether a user is permitted to execute the computer software; and
authenticating the enforcer processor by one or more of:
determining whether a hash code included within the enforcer processor matches a hash code generated by a user of the computer software at run time of the computer software; and
encrypting the enforcer processor prior to run time of the computer software using the private key and decrypting the enforcer processor at run time of the computer software using the public key.

11. The method of claim 10, comprising obfuscating the computer software.

12. The method of claim 10, wherein the license key comprises one or more of a product name, a feature name, a product version, a feature version, a licensee name, a licensee host name, an expiration date, a serial number of an x.509 certificate used to generate the public key, and a number of units permitted to execute the feature.

13. The process of claim 12, comprising determining with the enforcer processor whether a user is permitted to execute the computer software by reading data from the license file including one or more of the product name, the feature name, the product version, the feature version, the licensee name, the licensee host name, the expiration date, the serial number of the x.509 certificate that includes the public key, and the number of units permitted to execute the feature, and comparing the data from the license file with data associated with a user of the software including one or more of the product name, the feature name, the product version, the feature version, the licensee name, the licensee host name, the expiration date, the serial number of the x.509 certificate that includes the public key, and the number of units permitted to execute the feature; and wherein the enforcer processor terminates execution of the computer software when one or more of the comparisons do not match.

14. The process of claim 10, comprising terminating execution of the computer software upon one or more of a failure to properly decrypt the license file for the computer software at runtime of the computer software using the public key, a failure to match the hash code in the enforcer processor with the hash code generated by the user of the software at runtime of the computer software, and a failure to decrypt the enforcer processor using the public key at runtime of the computer software.

15. The process of claim 10, comprising caching a feature of the computer software for which it has been determined that the user is permitted to use.

16. A non-transitory computer readable medium comprising instructions that when executed by a processor execute a process comprising:
  encrypting a license file associated with computer software using a private key, wherein the license file comprises one or more license keys, each license key associated with a feature of the computer software; and
  decrypting the license file associated with the computer software at runtime of the computer software using a public key;
  determining using an enforcer processor whether a user is permitted to execute the computer software; and
  authenticating the enforcer processor by one or more of:
  determining whether a hash code included within the enforcer processor matches a hash code generated by a user of the computer software at run time of the computer software; and
  encrypting the enforcer processor prior to run time of the computer software using the private key and decrypting the enforcer processor at run time of the computer software using the public key.

17. The non-transitory computer readable medium of claim 16,
  wherein the license key comprises one or more of a product name, a feature name, a product version, a feature version, a licensee name, a licensee host name, an expiration date, a serial number of an x.509 certificate used to generate the public key, and a number of units permitted to execute the feature; and comprising instructions for:
  determining with the enforcer processor whether a user is permitted to execute the computer software by reading data from the license file including one or more of the product name, the feature name, the product version, the feature version, the licensee name, the licensee host name, the expiration date, the serial number of the x.509 certificate that includes the public key, and the number of units permitted to execute the feature, and comparing the data from the license file with data associated with a user of the software including one or more of the product name, the feature name, the product version, the feature version, the licensee name, the licensee host name, the expiration date, the serial number of the x.509 certificate that includes the public key, and the number of units permitted to execute the feature; and wherein the enforcer processor terminates execution of the computer software when one or more of the comparisons do not match; and
  terminating execution of the computer software upon one or more of a failure to properly decrypt the license file for the computer software at runtime of the computer software using the public key, a failure to match the hash code in the enforcer processor with the hash code generated by the user of the software at runtime of the computer software, and a failure to decrypt the enforcer processor using the public key at runtime of the computer software.

\* \* \* \* \*

UNITED STATES PATENT AND TRADEMARK OFFICE
CERTIFICATE OF CORRECTION

| | | |
|---|---|---|
| PATENT NO. | : 8,725,649 B2 | Page 1 of 1 |
| APPLICATION NO. | : 13/314964 | |
| DATED | : May 13, 2014 | |
| INVENTOR(S) | : Zhen-Qi Gan | |

It is certified that error appears in the above-identified patent and that said Letters Patent is hereby corrected as shown below:

In the Drawings

On sheet 3 of 3, Fig. 3, insert --20--, therefor

On sheet 3 of 3, Fig. 3, reference numeral 25, insert --(RAM)--, therefor

In the Specification

Column 4, line 57, delete "I/0" and insert --I/O--, therefor

Column 5, line 59, delete "40" and insert --47--, therefor

Column 5, line 61, delete "40," and insert --47,--, therefor

Column 6, line 5, delete "I/0" and insert --I/O--, therefor

Signed and Sealed this
Eighteenth Day of November, 2014

Michelle K. Lee
*Deputy Director of the United States Patent and Trademark Office*